Dec. 28, 1965   A. PAOLICCHI   3,225,604
BALANCING MACHINE
Filed July 30, 1963   6 Sheets-Sheet 1

INVENTOR
ALBERT PAOLICCHI
By Linton and Linton
ATTORNEYS

Dec. 28, 1965  A. PAOLICCHI  3,225,604
BALANCING MACHINE

Filed July 30, 1963  6 Sheets-Sheet 2

INVENTOR
ALBERT PAOLICCHI
By Linton and Linton
ATTORNEYS

Dec. 28, 1965  A. PAOLICCHI  3,225,604
BALANCING MACHINE

Filed July 30, 1963  6 Sheets-Sheet 3

INVENTOR
ALBERT PAOLICCHI
By Linton and Linton
ATTORNEYS

INVENTOR
ALBERT PAOLICCHI

Dec. 28, 1965     A. PAOLICCHI     3,225,604
BALANCING MACHINE
Filed July 30, 1963     6 Sheets-Sheet 5
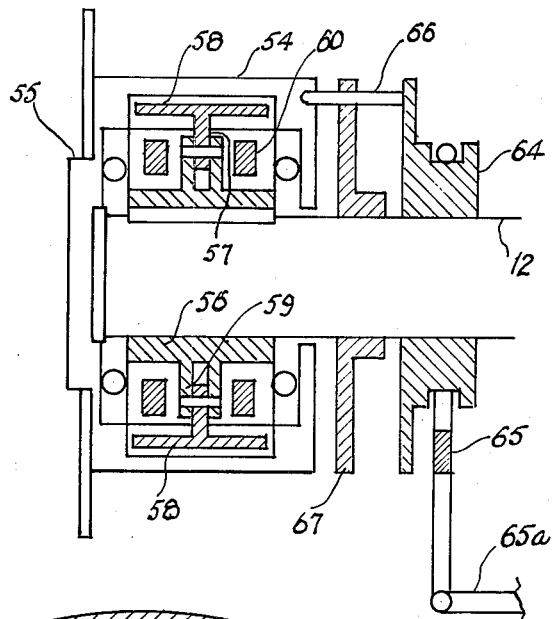
Fig. 10.
Fig. 11.
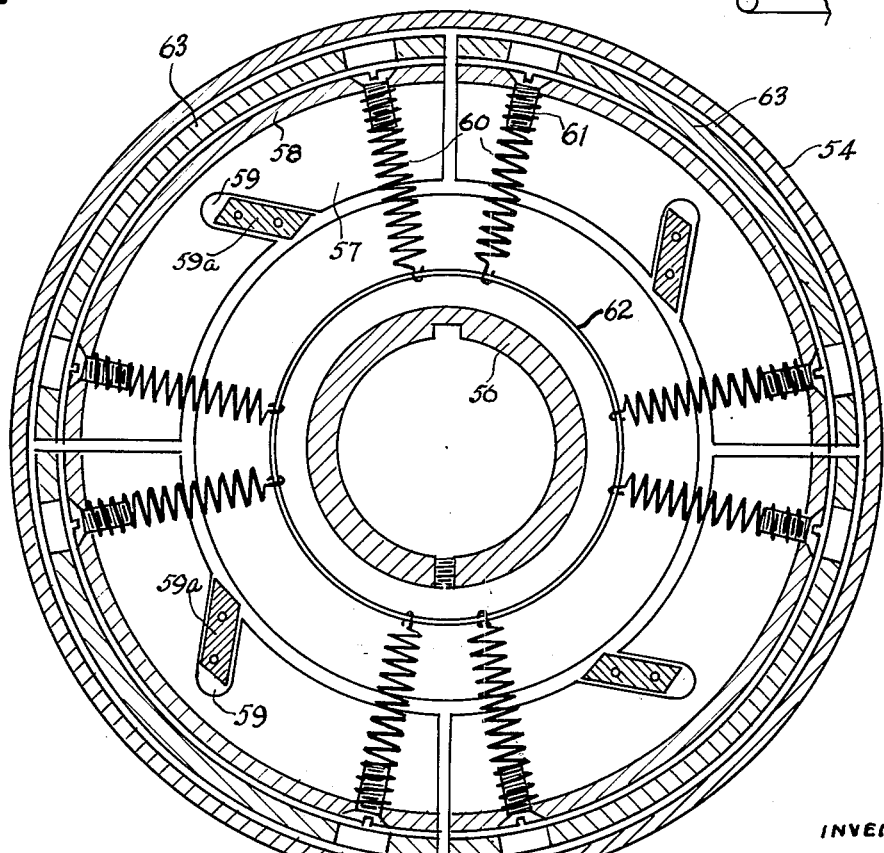
INVENTOR
ALBERT PAOLICCHI
By Linton and Linton
ATTORNEYS INVENTOR
ALBERT PAOLICCHI
By Linton and Linton
ATTORNEYS 3,225,604
BALANCING MACHINE
Albert Paolicchi, 25 Rosenberg Crescent, Kalgoorlie,
Western Australia, Australia
Filed July 30, 1963, Ser. No. 298,697
7 Claims. (Cl. 73—475)

This invention relates to an improved balancing machine of the type described in Australian patent specification No. 222,903.

The aforementioned specification describes a balancing machine comprising a horizontal shaft mounted so that it does not move vertically and has limited rotational movement about a substantially vertical axis, means for mounting the object to be balanced on one end of the shaft, recording means fitted to the other end of the shaft, and means for rotating the object on the shaft. The rotating means described comprises an electric motor having a friction wheel mounted thereon. The electric motor is pivotally mounted so that it can be rotated to bring the friction wheel into contact with the periphery of the object to be balanced, mounted on the one end of the horizontal shaft. The necessary rotational movement is thus imparted to the object. When it is not possible to bring the friction wheel into contact with the periphery of the object to be balanced, a wheel or disc is mounted on the horizontal shaft and the friction wheel brought into contact with the periphery of such wheel or disc.

It has now been found that the need for separate rotating means can be obviated by using the extended shaft of an electric motor as the horizontal shaft and mounting the casing of the motor so that it does not move vertically and has limited rotational movement about a substantially vertical axis.

Thus the present invention resides in a balancing machine comprising an electric motor mounted with its shaft substantially horizontal and the casing mounted so that it does not move vertically and has limited rotational movement about a substantially vertical axis, means for mounting the object to be balanced on one end of the shaft, and recording means fitted to the other end of the shaft or the motor casing.

Figure 1:
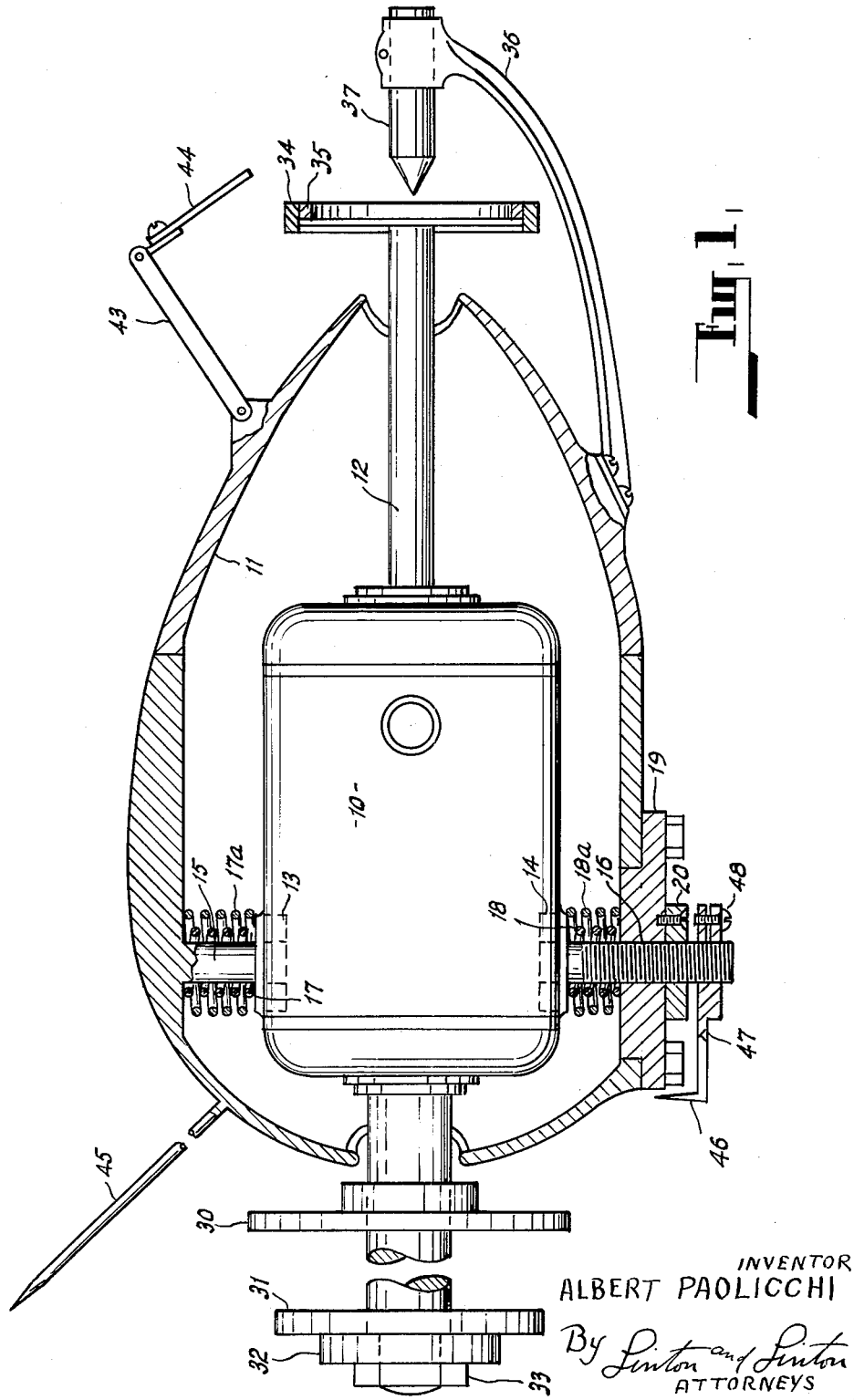
Figure 2:
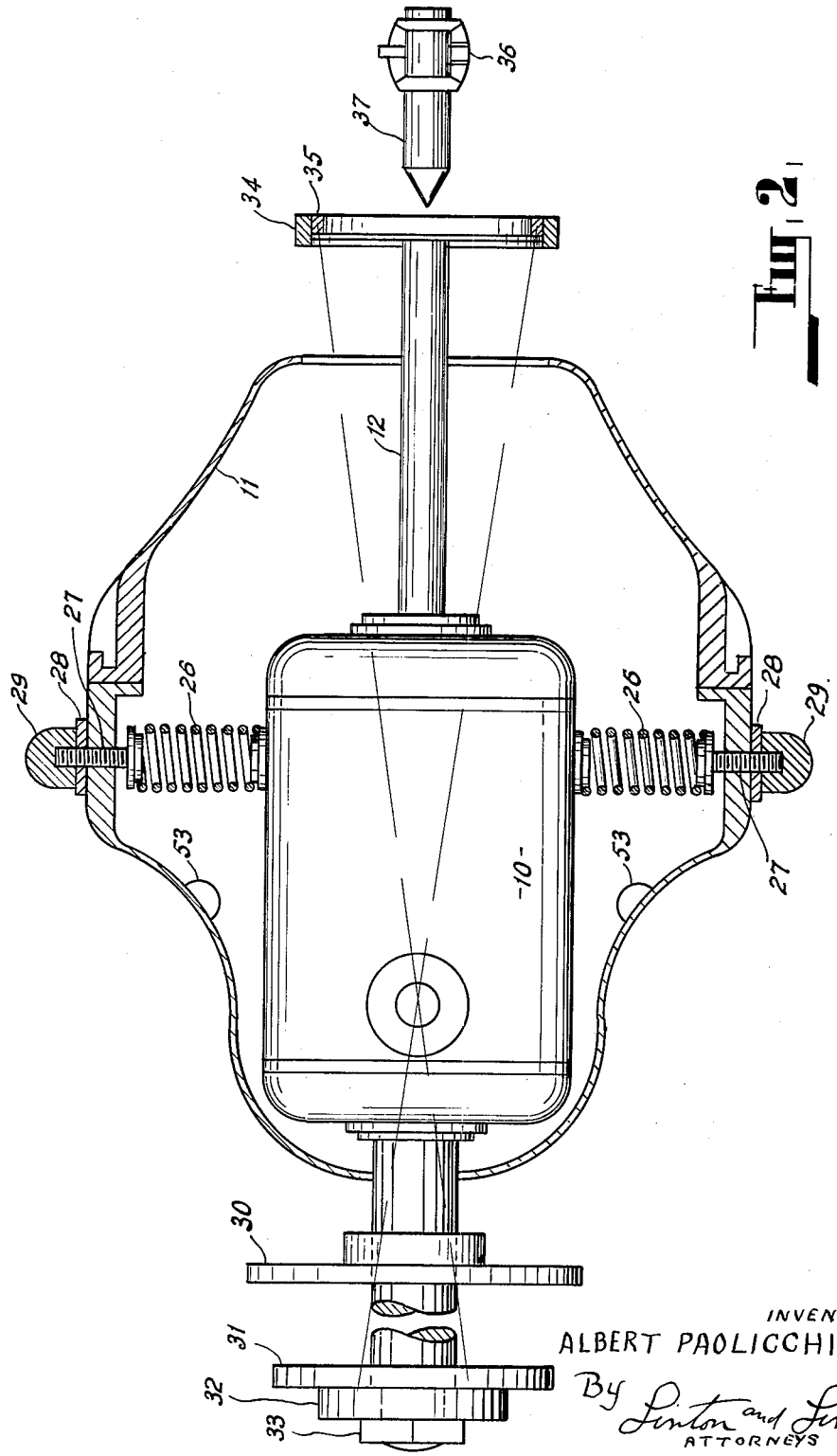
Figure 3:
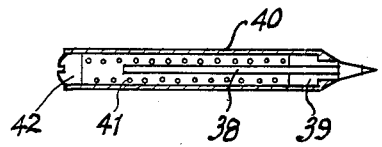
Figure 4:
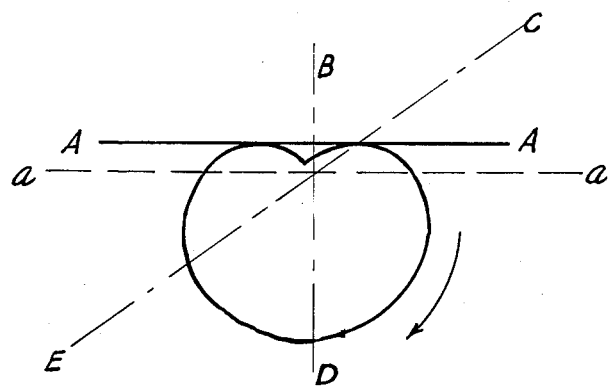
Figure 5:
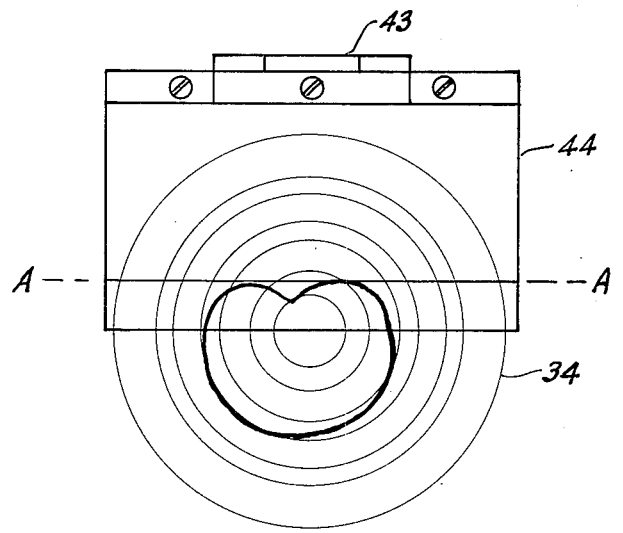
Figure 6:
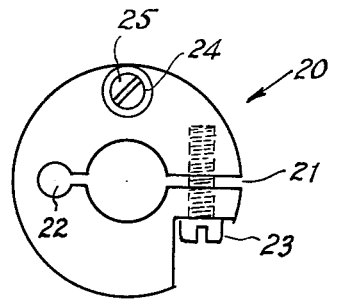
Figure 8:
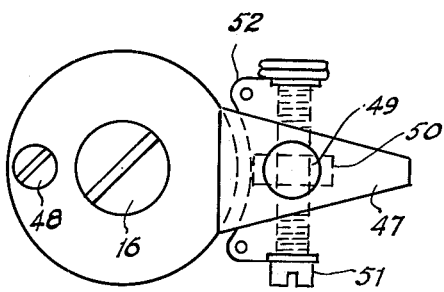
Figure 7:
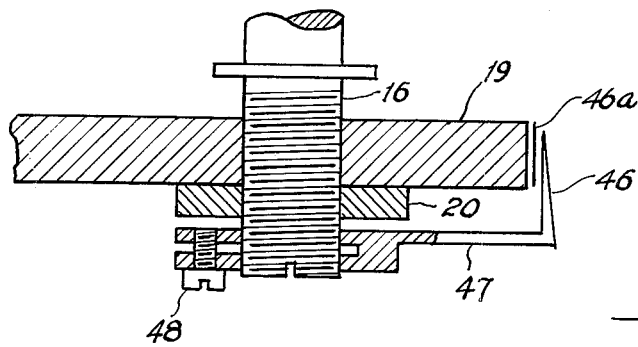
Figure 9:
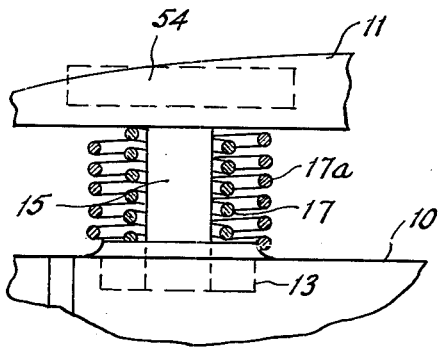
Figure 12:
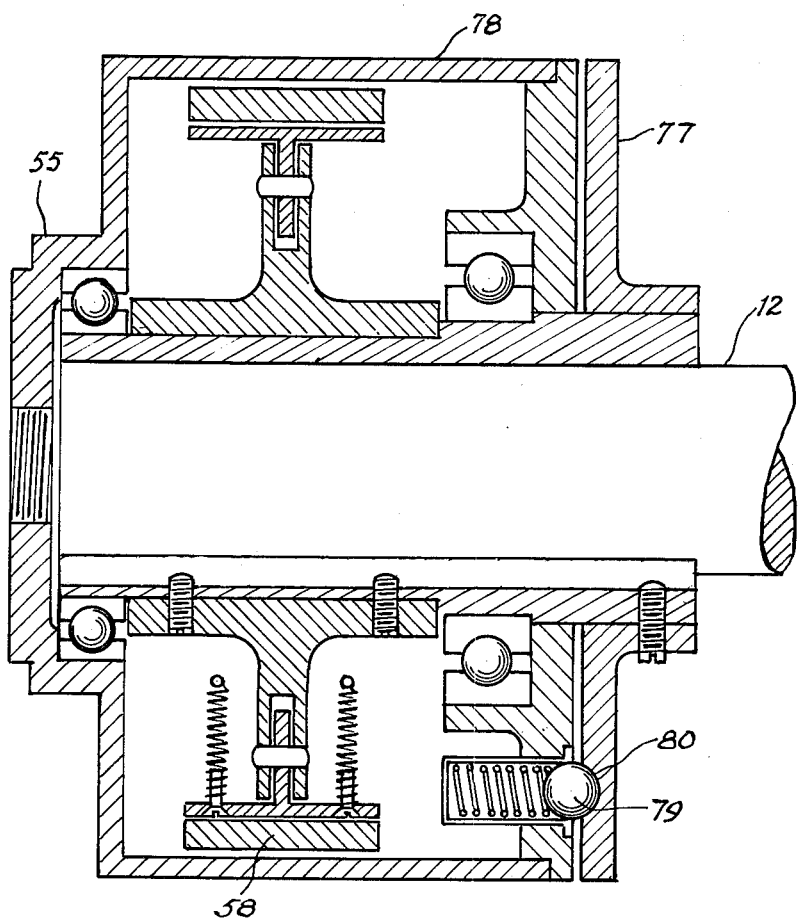

The invention will be better understood by reference to the following description of one specific embodiment thereof as shown in the accompanying drawings, wherein:

FIG. 1 is a sectional elevation;
FIG. 2 is a sectional plan view;
FIG. 3 is a sectional view showing the construction of the marking means;
FIG. 4 is a diagrammatic view showing the shape of the graph produced by the machine;
FIG. 5 shows the indicator gauge in position over the graph paper used;
FIG. 6 is an enlarged plan view showing the construction of the means used to lock the pivot bearing spigot in position;
FIG. 7 is an enlarged elevation showing the construction of the locking means and the bearing load indicator;
FIG. 8 is an inverted plan view of an alternative construction of the bearing load indicator;
FIG. 9 is an enlarged fragmentary sectional view showing the detail of the pivotal mounting of the motor;
FIG. 10 is a sectional view of a clutch and brake assembly which may be provided on the shaft of the machine when large and heavy objects are to be balanced;
FIG. 11 is an enlarged sectional view on line 11—11 of FIG. 10; and
FIG. 12 is a view corresponding to FIG. 10 of a modified form of clutch housing.

Referring now to FIGS. 1 and 2 of the drawings, the electric motor 10 is mounted within a casing 11 with each end of the shaft 12 of the motor projecting through openings in the casing. The motor is fitted with diametrally opposed bearings 13, 14 which engage spigots 15, 16 fixed to the casing. Coiled compression springs 17 and 18 are fitted around the spigots 15, 16 to ensure correct pre-loading of the bearings and to compensate for bearing wear. The loading of the bearings is effected by the spigot 16 which is threaded externally and which is screwed into an internally threaded hole in a plate 19 fitted into the casing 11. By screwing the spigot 16 in or out, the loading on the pivot bearings can be adjusted as required. To retain the spigot 16 in the desired position, a special lock nut 20 is used. A conventional lock nut cannot be used as when it is tightened against the plate 19, it could affect the loading of the bearings. The special lock nut 20 (see FIG. 6) is partially split by a diametral slot 21, one end of which terminates in a hole 22. The other ends of the slot can be moved towards or away from each other by a screw 23. A hole 24 is also provided in the nut 20 so that it can be fixed to the plate 19 by means of a screw 25. If desired, sufficient pre-loading of the bearings can be effected by the spring 17 alone, the spring 18 being omitted.

The rotational movement of the motor about its vertical axis through the spigots 15, 16 is limited by a pair of diametrally opposed springs 26 (see FIG. 2) provided on each side of the motor casing at 90° or at a convenient angle as required to the bearing housing. The outer ends of the springs 26 are held by spigots 27 screwed into the casing. The spigots 27 are locked in position by lock nuts 28 and a cap nut 29 is fitted on to the ends of the spigots to protect the thread. The lock nuts 28 may be constructed in substantially the same manner as the special lock nuts 20 used on the bearing spigots.

If desired, coiled torsion springs 17a, 18a may be fitted around the spigots to limit the rotational movement of the motor about its vertical axis. One end of each of the springs 17a, 18a is anchored to the outer casing 11 and the other end to the motor casing and the springs 18 are arranged so that they operate in opposite directions. Thus if the motor turns in one direction, the spring 17a around the upper spigot 15 winds up and the spring 18a around the lower spigot unwinds, whilst when the motor rotates in the opposite direction, the opposite is the case. Preferably one end of each torsion spring is anchored to the motor casing and the other end is anchored to a plate 54 (see FIG. 9) attached to the casing 11. The plate attached to the casing is provided with an arcuate slot so that by moving the plate relative to the casing, the torsional forces in the torsion spring can be increased or decreased as desired. If desired, the torsional springs 17a, 18a may be used to supplement the torsion springs 26 or they may be used independently.

In yet another form of the invention both the torsion springs 17a, 18a and the compression springs 26 may be omitted, the rotation of the motor about its vertical axis being limited by rubber or spring-loaded stops 53 mounted on the inside of the casing 11 (see FIG. 2). If desired, the stops 53 may be used in combination with the compression springs 26 or the torsional springs 17a, 18a or both.

One end of the shaft 12 projecting beyond the casing 11 is fitted with a disc 30 against which brake components (not shown) bear. A plate 31 is screwed on to the shaft to receive the various components to be balanced, the plate 31 being held in place by a flange 32 and a lock nut 33. The other end of the shaft is fitted with a disc 34 in which a circular disc of graph paper is held by a sleeve 35. An arm 36 projects from the outer casing and carries a spring-loaded marker pencil or stylus 37 the point of which is aligned with the longitudinal axis of the shaft 12. The marker comprises a pencil or pen 38 (see FIG. 3) mounted in a holder 39 which is slidably mounted in a barrel 40 so that the operative end of the pencil or pen projects from one end of the barrel. A coiled spring 41 is fitted into the barrel so that one end bears against the holder 39, the other end being held by a plug 42 screwed into the other end of the barrel. The stylus is fixed so that it remains in the position indicated by the intersection of the vertical plane passing the centre line of the shaft and the horizontal plane passing through the centre line of the shaft when the shaft is at rest and it remains in this position irrespective of the position in the horizontal plane assumed by the shaft during the balancing operation but is free to move back and forth under the action of the spring so that the point is maintained in contact with the graph paper in the holder.

A graph indicator arm 43 (see FIG. 1) is hingedly mounted on the rear of the casing 11, the outer end thereof being fitted with a graph indicator gauge 44. A pointer 45 is pivotally mounted on the housing so that it can be folded back on to the housing when not in use. If desired, the pointer 45 may be telescopic so that its length may be increased or decreased as desired.

To operate the machine, the operator places the article to be balanced on the end of the shaft and then operates a switch to supply current to the electric motor. The electric motor is operated until the critical speed is reached. The operator then releases the switch and the machine runs free. As the speed (r.p.m.) decreases, the object being balanced reaches its critical speed, the maximum oscillation of the shaft is produced and recorded on the graph disc, and the operator operates the brake which acts on the disc 30 to stop rotation of the shaft. The oscillation of the shaft and the rotation thereof causes the marker 37 to produce a graph on the graph paper held in the disc 34 of the configuration shown in FIG. 4. The graph for convenience can be described as "apple-shaped." The graph indicator gauge 44 is then moved into position in front of the graph (see FIG. 5) and the article rotated until the upper lobes of the apple-shaped graph are the upper position of the graph and aligned with the line AA on the graph indicator gauge. The pointer 45 is then moved so that its free end contacts the article to be balanced, indicating the position on the article to which weight must be added to obtain dynamic balance, this position being indicated by the line C in FIG. 4 of the drawings. The position on the article at 180° from the position indicated by the indicator 45 is the position from which weight must be removed in order to obtain dynamic balance. This position is indicated by the line E in FIG. 4 of the drawings. To directly mark the position where weight is to be removed on the article to be balanced using the pointer 45, the article to be balanced may be rotated until the lobes of the apple-shaped graph are the lower portion of the graph and align with line AA on the indicator gauge.

To obtain static balance, the article is allowed to rotate freely so that gravity will bring the heaviest portion of the article to the bottom. Once balanced, the article is again rotated to check that it is still properly dynamically balanced. If the article is properly balanced, only a point will appear on the centre of the graph.

By providing a series of concentric lines on the graph paper, it is possible for the operator to determine the correct amount of weight to be added to or removed from the article to achieve dynamic balance without the need for experimentation or calculation.

As the degree of oscillation necessary to obtain a sufficiently large graph to provide a proper indication of the dynamic unbalance is reached at a relatively low speed, it is possible for the operator to balance the article in a very short time. For example, if we take an automotive wheel of say 13″ diameter fitted with a 560 or 590 tyre, it will reach the maximum oscillation at a critical speed of approximately 200 r.p.m. to give the largest graph which is necessary for the operator to determine the amount of weight required to be added or to be removed to obtain precise dynamic balance. After producing the maximum oscillation, the brake means acting on the disc are operated to stop the rotation of the shaft and the operator then proceeds as described above.

The provision of the graph indicator gauge 44 and the pointer 45 substantially eliminates the need for the operator to carry out any mental calculations whatsoever to determine the position of unbalance in the wheel. The location of the pointer 45 is predetermined by experiment having regard to the type of article which is to be balanced on the machine. The position of the pointer will vary for example for motor vehicle wheels, flywheels and fan blades. If a multi-purpose machine is required, it is necessary that the position of attachment of the pointer 45 to the casing 11 be made adjustable so that it can be shifted as required according to the nature of the articles to be balanced.

The loading on the bearings on which the motor pivots can be readily adjusted to vary the sensitivity of the machine as required. The degree of loading is indicated by a pointer 46 moving past a scale 46a (see FIG. 7) provided on a vertical face of plate 19. The construction of the pointer is shown in detail in FIG. 7 of the drawings. The pointer 46 is integral with a split plate 47 which is fixed to the spigot 16 by means of a screw 48 clamping the split portions together. To adjust the loading, the lock nut 20 is released and the plate 47 rotated until the pointer 46 indicates the degree of pre-loading required. As the plate 47 is locked on to the spigot 16, the spigot is rotated to vary the loading on the bearings. With increased bearing loading, the sensitivity of the machine decreases, and vice versa.

An alternative construction of bearing load indicator is shown in FIG. 8 of the drawings. The plate 47 is locked on to the spigot 16 in the same manner as in FIG. 7 and is provided with a slot 49 in which a nut 50 is engaged. The nut 50 is screwed on to a threaded screw 51 rotatably mounted in a plate 52 which is fixed to the underside of the plate 19. By rotating the screw 51 in the desired direction, the loading on the spigot bearings can be adjusted as required.

In the embodiment described above the motor has been designed to operate on a three-phase electric current so that there is no question of brushes acting on the shaft to interfere with the rotation thereof during the static balancing of the article. If a single phase motor is used, it would be necessary to disengage the brushes. If a single phase motor is used, it is desirable to disengage the brushes from the motor shaft when the article is being statically balanced.

When the machine is to be used for balancing heavy objects such as the wheels of large trucks and the like, it is desirable that some form of clutch should be interposed between the shaft 12 and the object so as to prevent overloading of the motor 10. One suitable arrangement which may also function as a brake is shown in FIGS. 10 and 11 of the drawings. As shown in FIGS. 10 and 11 of the drawings the housing 54 of the clutch has a spigot 55 machined on the end thereof to receive the object to be balanced. The hub 56 of the clutch is fixed to the end of the shaft 12 within the housing 54. The stems 57 of a plurality of shoes 58 are slidably mounted on the hub 56 by means of a key 59a positioned within an angled slot 59 in the stem. The shoes are spring-loaded by means of coiled tension springs 60, one end of each spring being fixed to the shoe by means of a screw 61 passing through the shoe and the other end of each spring being hooked over a ring 62 mounted on the hub 56. By turning the screws 61, the tension in the springs 60 can be increased or decreased as required. A pad 63 of friction material is fixed to the outer face of each shoe.

A collar 64 is slidably mounted on the shaft 12 between the clutch assembly and the motor and is operated by a fork 65 connected to a lever 65a. The sliding collar is provided with a projecting pin 66 which passes through a hole in a flange 67 fixed to the shaft between the clutch housing and the sliding collar. The outer end of the pin 66 is located in a hole in the clutch housing, thereby positively locking the clutch housing to the shaft 12 so that it rotates therewith for reasons which will be readily apparent from the following description of the operation of the clutch.

After the object to be balanced has been mounted on the spigot 55, the pin 66 is withdrawn from engagement with the clutch housing. In this position the motor 10 will rotate without load when current is supplied thereto. The keys 59a in the angled slots 59 in the stems of the shoes will prevent the shoes 58 from moving outwardly until the centrifugal force reaches a predetermined level. At this stage the shoes are thrown into slipping engagement with the inner face of the clutch housing. When the shoes are in contact with the inner face of the clutch housing, the centrifugal force and the action of the keys 59 in the slots 59a will force the shoes into firm contact with the inner face of the clutch housing so that it rotates at the same speed as the shaft 12, whereupon the supply of current to the motor is cut off. The sliding collar is then moved so that the pin 66 engages the clutch housing and locks it to the shaft 12 so that it and the object mounted on the spigot rotate therewith. The graph for the unbalanced position of the object is then recorded in the manner described above.

After having recorded the graph for the unbalanced position, the object must be brought to rest so that it can be balanced. This can be done speedily by disengaging the pin 66 from the clutch housing, reversing the motor and using the clutch assembly as a brake. As the motor reaches its maximum speed, the centrifugal force acting on the shoes will move them outwardly into engagement with the inner face of the clutch housing. However, because of the angle of the slots 59a, the shoes will not be self-energising and will only produce a gentle braking effect on the clutch housing.

To ensure that the motor is not started or reversed with the pin 66 in engagement with the clutch housing, the switches are preferably mounted under a cover plate connected to or mounted on the lever 65a so that the switches are only accessible when the pin is in the disengaged position.

After the rotation has been stopped, the pin 66 is moved into engagement with the clutch housing so that the position of unbalance can be located using the indicators 44 and 45 as described above.

In the embodiment described above and shown in FIGS. 10 and 11, the operation of the locating pin 66 is effected manually. In the embodiment shown in FIG. 12 the locking of the clutch housing to the shaft is effected more or less automatically. The fixed flange 77 is positioned on the shaft 12 close to the end of the clutch housing 78. A spring-loaded ball 79 is positioned in the end of the clutch housing so that it projects into a locating hole 50 in the fixed flange.

When the motor is switched on, the force acting on the flange 77 will cause the locating hole 80 to disengage from the ball 79 and the ball will constantly ride over the locating hole as the two components rotate relative to each other. When the desired speed has been obtained, the motor is switched off and the shaft 12 gently slowed with the fingers until the ball engages in the locating hole. The two components will then rotate together and the graph can be recorded in the usual way. The motor is then reversed and again the ball disengages from the locating hole and will override the hole until the shaft has been brought to a stop. The shaft is then rotated relative to the clutch housing until the ball again engages the locating hole after which the balancing process can proceed as normally.

I claim:

1. A balancing machine comprising an electric motor, the shaft of which projects from both ends of the motor casing, pivotally mounted on a supporting frame with the shaft substantially horizontal for rotation about a substantially vertical axis on vertical spigots fixed to the supporting frame, the spigots engaging bearings fitted into the motor casing and coiled springs being fitted around the spigots to bear against said bearings, at least one of the spigots being adjustable so that the load on said bearings can be varied as required, and said rotational movement of said motor about said vertical axis being limited by a pair of coiled springs positioned in diametrally opposed positions on each side of the motor casing, each spring being anchored to the supporting frame and said springs being spaced apart from said vertical spigots along the longitudinal axis of said motor; means for mounting the object to be balanced on one end of the shaft of the motor so that it rotates therewith; recording means fitted to the other end of the shaft, said recording means comprising a disc fixed to said other end of the shaft so that it rotates therewith in a substantially vertical plane, said disc being adapted to carrying a removable paper disc, and a spring-loaded marking device positioned adjacent to the face of the disc with the point of the marking device bearing against the face of the disc at all times and being located at the centre of the disc when the motor is at rest; a graph indicator pivotally mounted on one end of an arm the other end of which is pivotally mounted on the supporting frame so that the indicator can be moved into a position immediately in front of the face of the disc; and a pointer one end of which is pivotally mounted on the supporting frame adjacent the end of the shaft on which the object to be balanced is mounted.

2. A balancing machine as claimed in claim 1 wherein a bearing load indicator is attached to the adjustable spigot.

3. A balancing machine as claimed in claim 1 wherein a bearing load indicator is attached to the adjustable spigot and comprises a pointer integral with a plate locked to the adjustable spigot, the pointer moving past a scale on a plate fixed to the supporting frame.

4. A balancing machine comprising an electric motor, the shaft of which projects from both ends of the motor casing, pivotally mounted on a supporting frame with the shaft substantially horizontal for rotation about a substantially vertical axis on vertical spigots fixed to the supporting frame, the rotational movement of said motor about said vertical axis being limited by a pair of coiled springs positioned in diametrally opposed positions on each side of the motor casing, each spring being anchored to the supporting frame and said springs being spaced apart from said vertical spigots along the longitudinal axis of said motor; a clutch housing rotatably mounted on one end of the shaft; centrifugal clutch means fixed to said one end of the shaft within the clutch housing; means for mounting the object to be balanced on the clutch housing; means for locking the clutch means; recording means fitted to the other end of the shaft, said recording means comprising a disc fixed to said other end of the shaft so that it rotates therewith in a substantially vertical plane, said disc being adapted to carry a removable paper disc, and a spring-loaded marking device positioned adjacent to the face of the disc with the point of the marking device bearing against the face of the disc at all times and being located at the centre of the disc when the motor is at rest; a graph indicator pivotally mounted on one end of an arm the other end of which is pivotally mounted on the supporting frame so that the indicator can be moved into a position immediately in front of the face of the disc; and a pointer one end of which is pivotally mounted on the supporting frame adjacent the end of the shaft on which the object to be balanced is mounted.

5. A balancing machine as claimed in claim 4 wherein the centrifugal clutch means comprise a plurality of shoes slidably mounted on a hub fixed to the shaft and adapted to be moved outwardly under the action of centrifugal force to engage the inner surface of the clutch housing, said shoes being provided with inclined slots slidably engaged by a pin located in a radial arm projecting from the hub.

6. A balancing machine comprising an electric motor, the shaft of which projects from both ends of the motor casing, said electric motor being pivotally mounted on a supporting frame with the shaft substantially horizontal for rotation about a substantially vertical axis on vertical spigots fixed to the supporting frame, the rotational movement of said motor about said vertical axis being limited by a pair of coiled springs positioned in diametrically opposed positions on each side of the motor casing, each spring being anchored to the supporting frame and said springs being spaced apart from said vertical spigots along the longitudinal axis of said motor; a clutch housing rotatably mounted on one end of the shaft; centrifugal clutch means fixed to said one end of the shaft within the clutch housing; means for mounting the object to be balanced on the clutch housing; recording means fitted to the other end of the shaft, said recording means comprising a disc fixed to said other end of the shaft so that it rotates therewith in a substantially vertical plane, said disc being adapted to carry a removable paper disc, and a spring-loaded marking device positioned adjacent to the face of the disc with the point of the marking device bearing against the face of the disc at all times and being located at the centre of the disc when the motor is at rest; a graph indicator pivotally mounted on one end of an arm the other end of which is pivotally mounted on the supporting frame so that the indicator can be moved into a position immediately in front of the face of the disc; a pointer one end of which is pivotally mounted on the supporting frame adjacent the end of the shaft on which the object to be balanced is mounted; and means for locking the clutch housing to the shaft, said locking means comprising a locking pin slidably mounted in a flange fixed to the shaft, one end of the locking pin being adapted to engage a hole in the clutch housing and the other end being fixed to a collar slidably mounted on the shaft, the collar being engaged by a fork connected to a lever pivotally mounted on the supporting frame.

7. A balancing machine comprising an electric motor, the shaft of which projects from both ends of the motor casing, pivotally mounted on a supporting frame with the shaft substantially horizontal for rotation about a substantially vertical axis on vertical spigots fixed to the supporting frame, the rotational movement of said motor about said vertical axis being limited by a pair of coiled springs positioned in diametrically opposed positions on each side of the motor casing, each spring being anchored to the supporting frame and said springs being spaced apart from said vertical spigots along the longitudinal axis of said motor; a clutch housing rotatably mounted on one end of the shaft; centrifugal clutch means fixed to said one end of the shaft within the clutch housing; means for mounting the object to be balanced on the clutch housing; recording means fitted to the other end of the shaft, said recording means comprising a disc fixed to said other end of the shaft so that it rotates therewith in a substantially vertical plane, said disc being adapted to carry a removable paper disc, and a spring-loaded marking device positioned adjacent to the face of the disc with the point of the marking device bearing against the face of the disc at all times and being located at the centre of the disc when the motor is at rest; a graph indicator pivotally mounted on one end of an arm the other end of which is pivotally mounted on the supporting frame so that the indicator can be moved into a position immediately in front of the face of the disc; a pointer one end of which is pivotally mounted on the supporting frame adjacent the end of the shaft on which the object to be balanced is mounted; and locking means for locking the clutch housing to the shaft, said locking means comprising a spring-loaded ball mounted on the clutch housing and adapted to engage a locating hole in a flange fixed to the shaft.

References Cited by the Examiner

UNITED STATES PATENTS

| | | | |
|---|---|---|---|
| 1,546,030 | 7/1925 | Schmidt | 73—477 |
| 1,731,880 | 10/1929 | Trumpler | 73—476 |
| 2,160,314 | 5/1939 | Ongaro | 73—477 |
| 2,622,436 | 12/1952 | Carr | 73—476 |
| 3,079,801 | 3/1963 | Hack | 73—462 |

FOREIGN PATENTS

| | | |
|---|---|---|
| 222,903 | 7/1959 | Australia. |
| 737,543 | 9/1955 | Great Britain. |
| 811,184 | 4/1959 | Great Britain. |

RICHARD C. QUEISSER, *Primary Examiner.*

JAMES J. GILL, *Examiner.*